United States Patent [19]
Druschke

[11] Patent Number: 4,783,222
[45] Date of Patent: Nov. 8, 1988

[54] GLASS FIBER REINFORCED POLYEPOXIDE PRODUCTS AND METHOD FOR PRODUCING SAME

[75] Inventor: Frank Druschke, Stuttgart, Fed. Rep. of Germany

[73] Assignee: International Business Machines Corporation, Armonk, N.Y.

[21] Appl. No.: 102,700

[22] Filed: Nov. 17, 1987

[30] Foreign Application Priority Data

Oct. 17, 1986 [DE] Fed. Rep. of Germany ..... 86114395

[51] Int. Cl.⁴ .................. C09K 3/00; C07D 307/00; C07F 7/10; B32B 17/06
[52] U.S. Cl. .................. 106/287.13; 106/287.16; 549/321; 549/303; 549/300; 528/18; 528/34; 528/41; 548/406; 556/419; 428/273; 428/391; 428/429
[58] Field of Search .................. 106/287.13, 287.16; 549/321, 303, 300; 528/18, 34, 41; 548/406; 556/419; 428/273, 391, 429

[56] References Cited

U.S. PATENT DOCUMENTS

| | | | |
|---|---|---|---|
| 2,844,595 | 7/1958 | Waisbrot | 549/303 |
| 3,472,817 | 10/1969 | Hedaya et al. | 549/303 |
| 3,558,741 | 1/1971 | Holub et al. | 548/406 |
| 3,576,031 | 4/1971 | Holub et al. | 528/18 |
| 3,787,439 | 1/1974 | Holub et al. | 548/406 |
| 4,056,651 | 11/1977 | Scola | 428/391 |
| 4,394,475 | 7/1983 | Temple et al. | 428/378 |
| 4,581,461 | 4/1986 | Rossi et al. | 548/406 |

*Primary Examiner*—Paul Lieberman
*Assistant Examiner*—Helene Kirschner
*Attorney, Agent, or Firm*—Shelley M. Beckstrand

[57] ABSTRACT

A surface treatment composition for glass fibers comprising an aqueous solution or emulsion of an organosilane which contains at least one isoimido group. The organosilane with the highest adhesion promotion is N-2-(isomaleimodo)aminoethyl-3-aminopropyl-trimethylsilane.

6 Claims, 3 Drawing Sheets

| COUPLING AGENT | APPLICATION CONDITIONS | CLASS | | | | | | |
|---|---|---|---|---|---|---|---|---|
| | | 1 | 2 | 3 | 4 | 5 | 6 | 7 |
| SILANE 1 | STANDARD | X | | | | | | |
| " | WITHOUT RINSE | | | X | | | | |
| " | 1 % | | | X | | | | |
| SILANE 2 | 0.2 % | X | | | | | | |
| " | STANDARD | X | | | | | | |
| " | 1 % | | X | | | | | |
| " (AMIC ACID) | STANDARD | X | | | | | | |
| SILANE 3 | STANDARD | | | | X | | | |
| Z6040 | STANDARD | | | | | | X | X |
| " | VENDOR APPLIED | | | | | | X | |
| | | | | | | | | |
| SILANE 1 | STANDARD | X | | | | | | |
| " | DICUMYLPEROXIDE | | | X | | | | |
| SILANE 2 | STANDARD | X | | | | | | |
| " | DICUMYLPEROXIDE | X | | | | | | |
| " | 170 C | | | | | X | | |
| Z 6040 | VENDOR APPLIED | | | | | | X | X |
| " | MEK* + METHYLGLYCOL | | | | | X | | |

* METHYL ETHYL KETONE

FIG. 2  TABLE 1

| TEST | TEST SPECIMEN | SILANE | Z 6040 |
|---|---|---|---|
| PRESSURE COOKER TEST | NIP LAMINATE* | 1.7 | 3 |
| DELAMINATION AFTER SOLDERING (NR. OF VOIDS) | 4 SPT CARD** | 0 | 20 |
| WATER ABSORPTION (%) | " | 0.17 | 0.28 |
| WET THERMAL SHOCK (NR. OF DEFECTS/40 PANEL SURF. AFTER 5 CYCLES FROM 0° TO 100°C) | " | 0 | 70 |
| SOLDER WAVE (NR. OF DEFECTS/40 PANEL SURF.) | " | 0 | 20 |
| INSULATION RESISTANCE AVG. (M AFTER 300 H AT 50°C, 80% HUM.) | " | 26 300 | 34 400 |

\* NON INTERNAL COPPER PLANES LAMINATE
\*\* 4 SIGNAL PLANES TEST CARD

FIG. 3    TABLE 2

GLASS FIBER REINFORCED POLYEPOXIDE PRODUCTS AND METHOD FOR PRODUCING SAME

BACKGROUND OF THE INVENTION

The present invention relates to a surface treatment composition for glass fibers, a method of coating glass fibers with said composition, and a method of preparing glass fiber reinforced polyepoxide products.

A number of fiber reinforced plastics are used commercially for various purposes. Articles such as sheets, tapes or fabrics wherein fibers are impregnated with resins such as polyimide, bismaleimide-triazine or preferably an epoxy are referred to as prepreg substrates. One important use of prepreg substrates is to provide a surface upon which a pattern of an electrical conductor can be provided to obtain circuit boards or circuit cards. The printed circuit boards or cards in turn are prepared from laminates of multiple layers of glass fiber impregnated epoxy resin compositions.

Among many factors governing the characteristics of a glass fiber/epoxy composite the fiber/matrix interface is considered to be the most sensitive region in the composite Weak adhesion in this region leads to defects such as delamination, blistering, plate back and the like, which seriously impede function, reliability and manufacturing yield of printed circuit boards. Therefore, increased board size, reduced circuitry dimensions, and increased operating temperatures of advanced multilayer boards require improved glass fiber/epoxy adhesion to achieve the required high quality standards.

To enhance the adhesion between these two-phase materials and to preserve it against moisture attack, it is a common practice to use coupling agents for improving the bond strength of epoxy or other resins to glass fiber surfaces. The most commonly used coupling agents are organosilane compounds of the general formula $X_3Si(CH_2)_nY$, in which n is an integer from 0 to 3, X is a hydrolyzable group and Y is an organofunctional group which is compatible and/or reactive with a given polymer matrix. Particularly useful silanes are gamma-aminopropyltriethoxysilane or 3-glycidoxypropyltrimethoxysilane.

U.S. Pat. No. 3,702,783 teaches the improvement in glass-resin bonding achieved by the employment of a mixture of 3-glycidoxypropyltrimethoxysilane as organofunctional silane and a methyltrialkoxysilane.

U.S. Pat. No. 4,500,600 teaches aqueous size compositions for glass fibers comprising gamma-aminopropyltriethoxysilane and alkoxysilanes.

U.S. Pat. No. 3,576,031 teaches organosilanes having at least one chemically-combined aliphatically unsaturated imido-organic radical (e.g., maleimidosubstituted organo-silane) and a method for making these materials. Said compounds can be employed to impart improved surface characteristics to cellulosic substrates and to make aliphatically unsaturated imido-substituted organopolysiloxanes In order to improve laminate performance even under extremely adverse environments, one major concern is to provide tenacious adhesion between the fibrous substrate and the resin composition. Although the use of silanes and especially amino- and glycidoxy-substituted silanes as mentioned above has proved to provide quite good adhesion with resin compositions, there still remains room for additional enhancement in the bonding strength between the resin, particularly epoxy resin, and the glass fiber substrate.

Therefore, an object of the invention is a new class of organosilane compounds with significantly improved adhesion characteristics that promises to provide significantly improved properties for advanced composite applications.

SUMMARY OF THE INVENTION

In accordance with the present invention, there is provided a method of coating fibers with a new class of organosilane composition and a method of producing glass fiber reinforced polyepoxide products.

BRIEF DESCRIPTION OF THE DRAWINGS

The foregoing and other features and advantages of this invention will be apparent from the following description of the preferred embodiments of the invention as illustrated in the accompanying drawings and examples.

FIG. 2 shows a table containing pressure cooker test results of glass fiber/epoxy hand laminates; and FIG. 3 shows a table containing a property comparison of laminates and cards fabricated with an adhesion promoter according to the invention and a prior art adhesion promoter.

DETAILED DESCRIPTION OF THE PREFERRED EMBODIMENT

Figure 1:
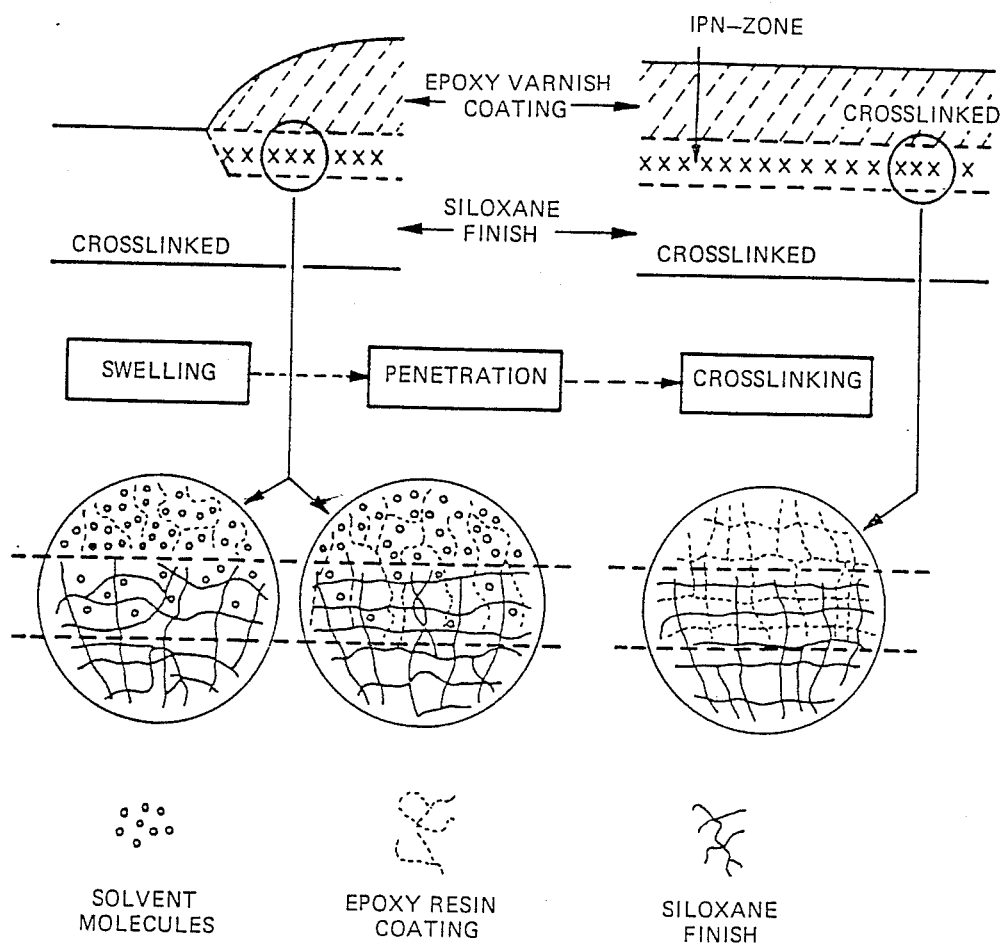
FIG. 1 shows a schematic structure concept of the glass epoxy interphase in accordance with the present invention.

Referring now to FIG. 1, fibrous substrates that can be coated with a composition according to the invention include materials such as fiberglass, polyamides and graphite. The preferred fibrous substrates are fiberglass or woven glass fabric.

Polymer compositions that can be reinforced with the aforementioned fibers comprise thermosetting polymers. Typical thermosetting polymers include epoxy, phenolic based materials, polyimides, polyamides and bismaleimide- triazine-(BT)-resins. Thermosetting polyimide resins for fiber composite preparation are described in U.S. Pat. No. 4,211,861.

U.S. Pat. No. 4,456,712 describes compositions suitable for making printed circuit boards containing a bismaleimide triazine polymeric component, a brominated epoxy and a solvent. Examples of some phenolic-type materials include copolymers of phenol, resorcinol and cresol.

The preferred thermosetting polymers are epoxy polymers. Typical epoxy resins include bisphenol A type resins obtained from bisphenol A and epichlorohydrin, and from brominated bisphenol A and epichlorohydrin, resinous materials obtained by the epoxidation of Novolak resins produced from a phenolic material such as phenol and an aldehyde such as formaldehyde with epichlorohydrin, polyfunctional epoxy resins such as polyglycidyl ethers of tetraphenylene and tetraglycidyldiaminodiphenyl methane, and alicyclic epoxy resins such as bis(3,4-epoxy-6 -methylcyclohexylmethyl)adipate. The preferred epoxy employed is of the brominated bisphenol A type. In addition, mixtures of epoxy resins can be employed when desired.

The epoxy resinous compositions also can contain curing agents and accelerating agents as is well-known in the art. Examples of suitable curing agents include anhydrides such as chlorendic anhydrides, nadic anhydride, methyltrimellitic anhydride; carboxylic acids; polyamides; polysulfides; urea-phenolformaldehydes; polyamines; and primary, secondary and tertiary amines. The preferred curing agent in the epoxy compositions is dicyandiamide. Moreover, mixtures of such with tertiary amines provide for faster curing rates. Such tertiary amines include benzyldimethyl amine, α-methyl benzyldimethyl amine, dimethylaminomethylphenol, tris(dimethylaminomethylphenol) and N,N,N′,N′-tetramethyl-1,3-butanediamine.

In addition, the epoxy resin is generally applied in the form of a solution in a suitable organic solvent. Suitable solvents include ketones such as acetone and methylethyl ketone; dimethylformamide and N-methyl pyrrolidone, ethers such as ethylene glycol monomethyl ether and propylene glycol monomethylether.

The preferred epoxy compositions employed in accordance with the present invention are disclosed in U.S. Pat. No. 3,523,037.

In general, the preferred epoxy compositions employed in the present invention comprise an epoxy resin having a high functionality of from about 3.5 to about 6, a second epoxy resin having a relatively low functionality of about 1.7 to about 2, a curing agent and a curing catalyst such as tertiary amine. The content of the high functionality epoxy resin improves heat and solvent resistance of the laminate.

More specifically, the high functionality epoxy resin, which is the polyglycidyl ether of tetraphenylene having an epoxide equivalent weight of about 210 to 240, is present in the composition in an amount of about 10 to 30 parts per hundred by weight of resin solids; the low functionality epoxy resin, which is the reaction product of tetrabromo bisphenol A and epichlorhydrin having an epoxide equivalent weight of about 455 to 500 and a bromine content of about 19% to 23% by weight of the resin, is present in the composition in an amount of about 70 to 90 parts per hundred by weight of resin solids; the curing agent, which is preferably dicyandiamide, is present in the composition in an amount of about 3 to 4 parts per hundred by weight of resin solids; a tertiary amine as a catalyst is present in the amount of about 0.2 to 0.4 part per hundred by weight of resin solids. The remainder is a suitable solvent.

The amount of polymer employed is about 45% to 55% by weight of polymer solids based upon the prepreg. The glass fabric is coated with the polymer composition in the same manner as disclosed in U.S. Pat. No.3,523,037.

The fabric is impregnated with the epoxy composition, and then passed through a pair of doctor rolls whereby excess epoxy resin solution is removed. After combining with the reinforcing fibers, the epoxy composition is then cured to the B stage using temperatures between about 93° C. and 177° C. and for times of about 3 minutes to 10 minutes. When sheets are employed, the thickness is usually between about 0.04 and 0.30 mm.

The now impregnated fabric can be divided into sheets of desired size. A number of sheets, depending on the desired properties of the final product, are interleaved between sheets of electrolytic copper foil and placed between two polished metal plates. This assembly is then placed between platens of a laminating press for lamination to form the printed circuit board. The assembly is subjected to pressures which may vary from about 345 kPa to 13,800 kPa, depending upon the resin content, flow of the prepreg, and laminate temperatures. The laminate temperature is preferably about 150° C. to 200° C. The time of the pressing operation is variable.

Before impregnating the glass fabric with the above described epoxy composition, the glass fibers or glass fabrics are coated with an aqueous solution or emulsion comprising an organofunctional silane. According to the invention a new specific type of organofunctional silane has been developed which modifies the interface between the glass fibers and the epoxy resin matrix and which thus avoids effects detrimental to adhesion such as moisture pick-up, thermal instability, chemical degradation and the like. These improvements have been achieved by the implementation of epoxy/hardener specific reaction sites in and the addition of functional groups for homopolymerization to the coupling agent structure. The adhesion between the polymer silane adhesion promoter layer and the epoxy polymer layer is thought to depend critically on the interdiffusion between the layers and a simultaneous reaction forming interpenetrating networks (i.e., separate networks interconnected by entanglements and interchain bonding, as shown in the IPN-Zone of FIG. 1).

The organofunctional silanes according to the invention have the formula:

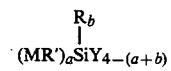

where R is selected from monovalent hydrocarbon radicals and halogenated monovalent hydrocarbon radicals, R' is selected from divalent hydrocarbon radicals, halogenated divalent hydrocarbon radicals, secondary, tertiary amino-functional, and quaternary ammonium-functional divalent hydrocarbon radicals, Y is a hydrolyzable radical and M is an aliphatically unsaturated isoimido radical of the formula:

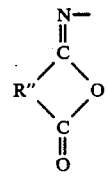

where R″ is an aliphatically unsaturated divalent organic radical selected from hydrocarbon radicals and halogenated hydrocarbon radicals;

a is an integer from 1 to 3 inclusive and b is a whole number from 0 to 2 inclusive and the sum of a+b is equal to 1 to 3 inclusive.

Radicals represented by R in the aforementioned formula can be: aryl radicals, alkyl radicals, alkenyl radicals, cycloaliphatic radicals and the like. Radicals represented by R' can be: arylene radicals, halogenated aryl radicals, arylenealkylene radicals, alkylene radicals, such as ethylene, propylene, secondary, tertiary amino-functional, and quaternary ammonium-functional alkylene radicals and the like. Radicals represented by R″ can be:

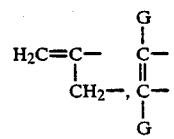

-continued

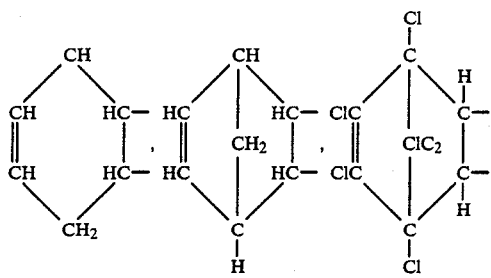

where G is selected from hydrogen, halogen and methyl. Radicals represented by Y can be: halogen radicals; alkoxyl and aryloxy radicals; amido radicals; imidato radicals; aminoxy radicals; amino radicals, and acyloxy radicals. Radicals represented by R, R', R" and Y can be all the same or any two or more of the aforementioned radicals respectively. A detailed description of the radicals in the aforementioned formula is disclosed in U.S. Pat. No. 3,576,031.

Included by the isoimido-substituted organo-silanes according to the invention are, for example:

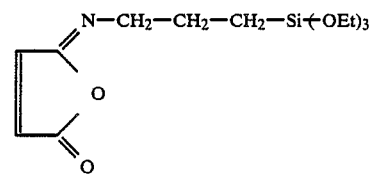

N-3-(isomaleimido)-aminopropyl-triethoxysilane (silane 1),

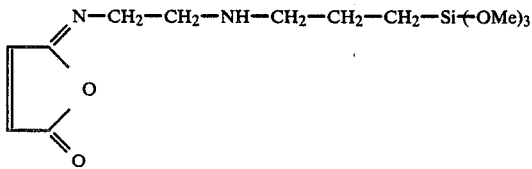

N-2-(isomaleimido)-aminoethyl-3-aminopropyl-trimethoxysilane (silane 2) with the latter being the most effective one.

As the surface of the glass fibers is negatively charged, the following isomaleimidoorganosilane has also been prepared and tested:

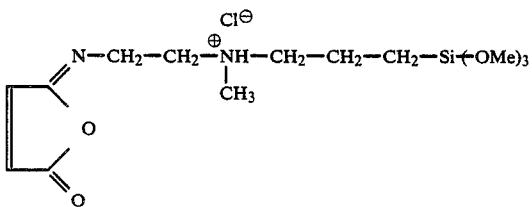

N-3-(trimethoxysilylpropylamino)-N-methyl-N-2-(isomaleimido)aminoethyl ammonium chloride (silane 3).

The following examples are illustrative of the invention which is delineated in the appended claims.

PREPARATION OF ADHESION PROMOTOR

Since N-2-(isomaleimido)-aminoethyl-3-aminopropyltrimethoxysilane (silane 2) is the most effective glass fiber adhesion promoter for strengthening the bond to epoxy resins, its preparation is discussed in more detail hereinbelow.

N-2-(isomaleimido)-aminoethyl-3-aminopropyltrimethoxysilane was prepared as follows. Maleic anhydride (MA, 1.01 moles) was dissolved in 500 ml methylenechloride and placed in a 2 liter four-necked glass reaction flask fitted with a stirrer, a thermometer, a nitrogen gas inlet and a drying tube. 2-aminoethyl-3-aminopropyl-trimethoxysilane (DAMO, 1.0 mole) was dissolved in 500 ml methylenechloride. The resulting solution was added dropwise to the vigorously stirred solution of MA. The reaction solution was kept at about 0° C. to 5° C. After the DAMO solution was added, the solution was stirred for an additional four hours. Then a solution of N,N'-dicyclohexylcarbodiimide (DCC, 1.01 moles) in 200 ml methylenechloride was slowly added to the cooled (about −10° C.) solution of the amide acid silane. After completion of the DCC addition, the stirring was continued for an additional 10 hours. The N,N'-dicyclohexyl urea (DCU) that precipitated during the course of the DCC addition, was filtered off. The filtrate was concentrated on a rotary evaporator and cooled in the refrigerator. An additional but small amount of DCU precipitated and was filtered off. The product was isolated after solvent evaporation and characterized by infrared spectroscopy.

The thermal properties of the isomaleimidosilanes were determined with a Perkin Elmer thermal analyzer/differential scanning calorimeter (DSC). Exothermic transitions due to the polymerization of maleimide double bond were observed in the temperature range of 240° C. to 290° C. Calorimeter measurements also showed that the maleimidosilanes can be polymerized at considerably lower temperatures by addition of organic peroxides.

FT-IR (Fourier Transform Infrared Spectroscopy) measurements of the absorption spectra of the maleimidosilanes showed that amide acids have been converted to the corresponding imides and to a very large extent to the isoimide isomers of the maleimidosilanes.

Adhesion Promoter Selection

The selection of the most effective adhesion promoter and its comparison with the most frequently used commercially available adhesion promoter glycidoxypropyltrimethoxysilane (Z 6040 of the Dow Corning Corporation) were performed by determining the hydrothermal stability of small test laminates in a pressure cooker test.

For preparing hand laminates, heat cleaned glass fabrics (style 108, ASTM 142) were fastened on metal frames and treated with a solution of the adhesion promoter by a 5 minutes dip coating. The adhesion promoter was employed in amounts of 0.2%, 0.5% and 1.0% by weight in methanol/water (5/95) based upon the weight of the solution. The pH-value of the solution was adjusted to 4.3 by the addition of acetic acid (2 ml). After dip coating, the samples were rinsed with deionized water for 5 minutes and dried in a forced air oven for 3 minutes at 140° C. The 0.5% by weight adhesion promoter concentration as well as the drying at 140° C. are defined as "standard" in the table shown in FIG. 2.

The glass fabric fastened on the frame was dipped in Araldite 9302 from the Ciba Products Co. which is a brominated epoxy resin solution based on tetrabromo bisphenol A and further modified with a higher functionality epoxy as described in U.S. Pat. No. 3,523,037. The coated fabric samples were taken from the epoxy resin solution after a dwell time of 5 minutes and were B-staged in a forced-air oven for 3 minutes at 140° C. The B-stage conditions were chosen to match the resin flow specifications for this type of prepreg material. After cooling of the prepregs to room temperature, they were cut from the frame to a size of 12.5 by 12.5 cm and then stored in a desiccator.

Three of the prepregs were used to prepare 3-ply test samples clad with two copper foils. The respective laminates were laminated in a press at 500 N/cm$^3$ and 175° C. for 107 minutes. After removal of the copper by etching with ferrichloride the test samples were cut to a size of 10 by 10 cm. Subsequently, the samples were subjected to the aforementioned pressure cooker test. This test is valuable in predicting whether completed circuit boards will withstand humidity cycling. The penetration of water into the interfacial region of the test samples was accelerated by boiling the samples for about 30 to 60 minutes at about 0.98 to 1.5 bars of pressure in a pressure cooker. The visual inspection of the laminates showed noticeable degrees of debonding between glass fibers and epoxy resin which is known as blisters or measles, with the extent of damage being classified into seven categories (1=none, 7=total).

From the test results summarized in FIG. 2, it is evident that N-2-(isomaleimido)-aminioethyl-3-aminopropyltrimethoxysilane (silane 2) has the greatest potential of all tested adhesion promoters with respect to its resistance to hydrothermal stress. Therefore, silane 2 was selected for a more detailed characterization by processing and testing of 4 signal planes test cards (4 SPT cards) and non internal copper planes laminates (NIP laminates) under production conditions for boards.

The results summarized in FIG. 2 suggest that:
(a) in view of the degree of blister formation, the three synthesized adhesion promoters are ranking in the following order:
silane 2>silane 1>>silane 3;
(b) the laminate stability, i.e., bond durability, is improved by water-rinsing the glass fabric immediately after its impregnation with the solution of the adhesion promoter. This confirms that not only the chemical structure but also the application procedure plays a significant role for adhesion promoting effectiveness;
(c) adhesion promoter concentrations in aqueous solution between about 0.2 and about 0.5% b. w. are to be preferred since FIG. 2 shows that the highest resistance to water attack was obtained within this range of concentration; and
(d) the drying of the adhesion promoter coating on the glass fiber fabric at elevated temperatures of 170° C. instead of 140° C. is detrimental to the glass fiber/epoxy adhesion properties or favorable to blister formation. The failure rate of silane 2 coatings is increased from class 1 when dried at 140° C. to class 4 when dried at 170° C.

By using multi-reactive isomaleimidosilanes, hydrolytically stable adhesive layers are generated. It is assumed that both the ability to form an entanglement network by homopolymerization of the ethylenically unsaturated isomaleimide function and the increased reactivity with the epoxy resin system are responsible for the hydro-phobicity of the glass fiber/epoxy interphase and consequently for the observed improvement of adhesion. All pressure/cooker solder blister test results indicate that silane 2 is the adhesion promoter with the best performance.

In order to confirm the adhesion promotion of N-2-(isomaleimido)-aminoethyl-3-aminopropyl-triethoxysilane (silane 2) by tests under manufacturing process conditions, a scaled up synthesis for silane 2 preparation was developed. For preparing higher quantities of silane 2 and in order to avoid gelation of the reaction mixture, the original preparation method was modified in that a higher dilution (50%) of the reactants was chosen. The 2 kg of silane 2 which were required as adhesion promoter for treating full size glass fabric rolls (style 108, 594 ASTM 142) was synthesized in four laboratory runs. Next, prepregs were fabricated by impregnation of the glass fabric with Araldite 8021 epoxy resin, followed by B-staging of the resin. In accordance with the four SPT card lay up pattern, the prepregs and 1 oz (0.035mm thick) copper foils were laminated and relaminated in a vacuum press. The processing of the cards was conducted following specified qualification procedures. Furthermore, 16-ply copper clad laminates without internal copper planes (NIP laminates) were fabricated following common process specifications. A test program covering a number of glass fabric and epoxy resin controlled laminate properties was used to ensure that the adhesion promoter did not deteriorate these properties.

Four SPT cards and NIP laminates fabricated as described above were used as test samples. The test results are shown in FIG. 3. All properties tested meet the specification requirements. Particularly the pressure cooker and solder blister test and the wet thermal shock test give evidence of the high potential of silane 2 in adhesion promotion. In the first mentioned test the samples were treated in vapor in a pressure cooker for about 30 to 60 minutes at about 0.98 to 1.5 bars of pressure. Then these samples were dipped into molten solder at about 260° to 266° C. for 15 seconds. The sudden conversion of water penetrated into the interior of the laminate to steam causes delamination which may be observed by visual inspection. The increased insulation resistance and ability to resist hydrothermal stresses is most likely due to the excellent adhesion between the silane 2 treated glass fiber surfaces and the epoxy resin.

In one example glass fibers were treated with the maleimido- substituted organosilanes described in U.S. Pat. No. 3,576,031. Hand laminates, NIP laminates, and four SPT cards were prepared as test specimen. The test results were comparable to those achieved with glycidoxypropyltrimethoxysilane (Z 6040 of the Dow Corning Corp.) which confirms the adhesion promotion of the inventive isomaleimidosilanes.

What is claimed is:
1. Surface treatment composition for glass fibers cop prising an aqueous solution or emulsion of an organosilane of the formula

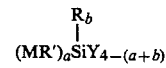

where R is selected from monovalent hydrocarbon radicals and halogenated monovalent hydrocarbon radicals, R' is selected from divalent hydrocarbon radicals, halogenated divalent hydrocarbon radicals and secondary, tertiary amino-functional, and quaternary ammonium-functional divalent hydrocarbon radicals, Y is a hydrolyzable radical, and M is an aliphatically unsaturated isoimido radical of the formula

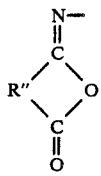

where R" is an aliphatically unsaturated divalent organic radical selected from hydrocarbon radicals and halogenated hydrocarbon radicals; a is an integer from 1 to 3 inclusive and b is a whole number from 0 to 2 inclusive, and the sum of a+b is equal to 1 to 3 inclusive.

2. The composition of claim 1 comprising an aqueous solution or emulsion of an organosilane where M is an isoimido radical with R" including radicals such a

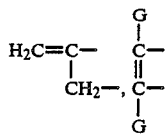

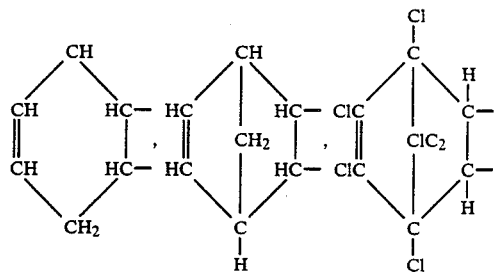

with G being selected from hydrogen, halogen and methyl.

3. The composition of claim 2 comprising an aqueous solution or emulsion of an organosilane where M is an isomaleimido radical, R' is selected from a secondary, tertiary amino-functional or quaternary ammonium-functional divalent hydrocarbon radical, Y is OR''', where R''' is a lower alkyl radical such as methyl, ethyl or propyl butyl, a is 1, and b is 0.

4. The composition of claim 3 comprising an aqueous solution or emulsion of N-2-(isomaleimido)-aminoethyl-3-aminopropyl-trimethoxysilane.

5. The composition of claim 4 wherein said organosilane is employed in an amount within the range from 0.2 to about 1.0% b. w. of said aqueous solution.

6. The composition of claim 5 wherein said aqueous solution contains an acid selected from the group of acetic acid, formic acid, oxalic acid or mixtures thereof.

* * * * *